Jan. 20, 1970 — J. O. STEWART — 3,490,789
LOAD EQUALIZING HITCH ASSEMBLY
Filed May 8, 1969
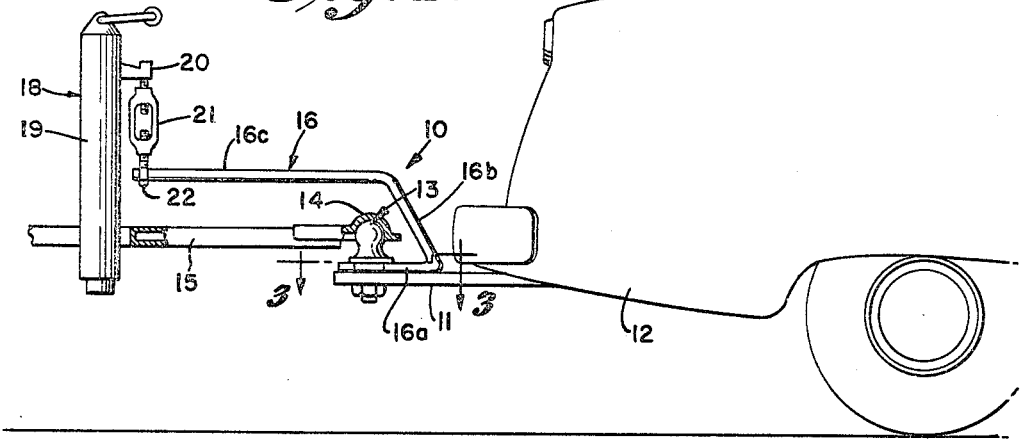
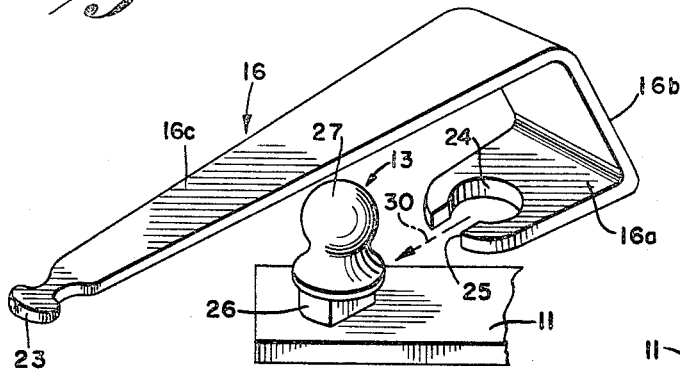
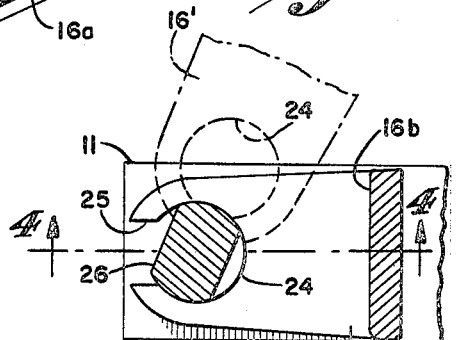
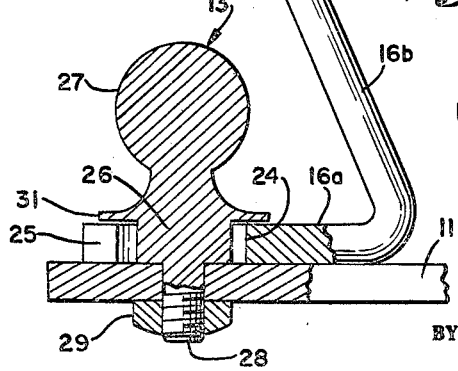
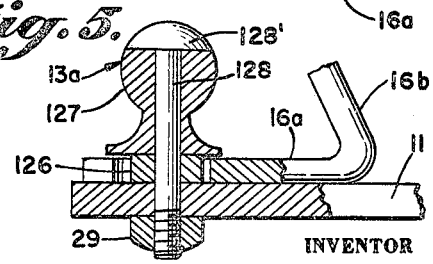
INVENTOR
JOHN O. STEWART
BY *Munson H. Lane*
ATTORNEY United States Patent Office 3,490,789
Patented Jan. 20, 1970

3,490,789
LOAD EQUALIZING HITCH ASSEMBLY
John O. Stewart, 419 E. 2nd St.,
Russellville, Ark. 72801
Continuation-in-part of application Ser. No. 663,318,
Aug. 25, 1967. This application May 8, 1969, Ser.
No. 823,023
Int. Cl. B60d 1/06, 1/00
U.S. Cl. 280—406                5 Claims

ABSTRACT OF THE DISCLOSURE

A drawbar carries a ball unit which is engaged by a socket at the front end of a draft tongue. A rigid load equalizing arm has a base portion which is held in supporting engagement with the drawbar by the ball unit. The arm extends upwardly over the ball unit and socket and rearwardly over the draft tongue to vertically adjustable suspension means provided on the draft tongue rearwardly of the socket. The base portion of the arm is formed with an aperture and slot cooperating with a specially shaped base of the ball unit so that the arm may be quickly connected to and disconnected from the latter.

RELATED APPLICATION

This application is a continuation-in-part of my co-pending application Ser. No. 663,318, filed Aug. 25, 1967 and now Patent No. 3,445,125.

This invention relates to new and useful improvements in trailer hitches, and in particular the invention relates to trailer hitches of the general type disclosed in my abovementioned application Ser. No. 663,318 wherein a ball and socket connection is provided between a drawbar and a draft tongue together with load equalizing means to prevent sagging at the ball and socket connection by transferring a major portion of the load from the draft tongue directly to the drawbar.

In the aforementioned application the load equalizing means comprise an equalizing arm or bar which has one end portion thereof removably inserted in a special housing provided on the drawbar and the other, rear end of the arm is connected to vertically adjustable suspension means provided on the draft tongue.

The principal object of the present invention is to provide an improved, simplified load equalizing structure which eliminates the special housing on the drawbar and is therefore lighter in weight. Moreover, the invention utilizes a simple load equalizing arm which is held in position on the drawbar by its engagement with the ball unit and which is shaped so as to have a load bearing contact with the drawbar forwardly of the ball unit, whereby a greater efficiency is attained in transferring the load from the draft tongue to the drawbar through the load equalizing arm. Also, the particular arm arrangement of the invention effectively functions to eliminate lateral swaying at the ball and socket connection. As another important feature, the invention provides means for quickly attaching the load equalizing arm to and detaching it from the ball unit on the drawbar.

With the foregoing more important object and features in view and such other objects and features which may become apparent as this specification proceeds, the invention will be understood from the following description taken in conjunction with the accompanying drawings, wherein like characters of reference are used to designate like parts, and wherein:

FIG. 1 is a fragmentary side elevational view showing the load equalizing hitch of the invention;

FIG. 2 is a fragmentary perspective view on an enlarged scale, showing the manner in which the load equalizing arm is applied to the base of the ball unit on the drawbar;

FIG. 3 is a fragmentary horizontal sectional view on an enlarged scale, taken substantially in the plane of the line 3—3 in FIG. 1;

FIG. 4 is a vertical sectional detail, taken substantially in the plane of the line 4—4 in FIG. 3; and FIG. 5 is a sectional detail, similar to FIG. 4, but showing a modified arrangement of the ball unit.

Referring now to the accompanying drawings in detail, the load equalizing hitch assembly of the invention is designated generally by the reference numeral 10. The same comprises a drawbar 11 which is suitably secured to and extends rearwardly from a towing vehicle such as an automobile 12, the rear end portion of the drawbar carrying a ball unit 13 for engagement by a socket 14 at the front end of a draft tongue 15 of a trailer (not shown), in accordance with conventional practice.

The invention concerns itself primarily with the provision of an improved load equalizing arm 16, which is held in supporting engagement with the drawbar 11 by the ball unit 13 as hereinafter described, and which extends upwardly over and rearwardly beyond the ball and socket connection 13, 14 to suspension means 17 provided on the draft tongue 15 at a point rearwardly from the socket 14. For all practical purposes the suspension means 18 may be of the type disclosed in my aforementioned application Ser. No. 663,318, including a screw-type jack 19 secured to the draft tongue and provided with a hanger 20 which may be moved upwardly and downwardly by actuation of the jack. A turnbuckle 21 is suspended from the hanger 20 and includes an eye 22 with a tongue-shaped rear end portion 23 of the load equalizing arm 16 may be separably engaged.

The arm 16 includes a relatively wide base portion 16a, an intermediate portion 16b which extends upwardly from the base portion, and a longitudinally tapered top portion 16c which extends rearwardly from the intermediate portion to terminate in the aforementioned tongue-shaped rear end portion 23. The base portion 16a lies flatly on and is in a load supporting engagement with the drawbar 11 while extending forwardly from the ball unit 13, and means are provided for quickly attaching the arm 16 to and detaching it from the ball unit 13 which serves to hold the base portion 16a of the arm in position on the drawbar 11.

These means involve the formation of a circular aperture 24 in the base portion 16a, along with a slot 25 which is narrower than the diameter of the aperture and is located on the longitudinal center of the base portion 16a, or in other words, on the line of draft. The ball unit 13 consists of a base 26 surmounted by a ball member 27, the base 26 having a depending screw-threaded shank 28 whereby the entire ball unit may be secured to the drawbar 11 by a nut 29 on the shank. The base 26 is specially shaped as a part of a disc with segments cut off from its opposite side portions, so that it is horizontally elongated as is best shown in FIG. 3, with its major axis or dimension conforming substantially to the diameter of the aperture 24 and its minor axis or dimension conforming substantially to the width of the slot 25. Thus, when the major axis of the base 26 is aligned with the slot 25, the base may be passed through the slot into the aperture 24 or, expressed in another way, the base portion 16a of the arm 16 may be applied to the base 26 of the ball unit by moving the same onto the ball base 26 in the direction of the arrow 30 in FIG. 2.

It is to be noted in this connection that the ball unit 13 is secured to the drawbar 11 by the nut 29 in such position that the major axis or dimension of the base 26 is oblique to the line of draft, so that when the arm 16 is being applied to or removed from the ball unit, it must be held in the same oblique position as shown in FIG. 2 and also by the dotted lines 16' in FIG. 3. However, when the arm 16 is turned horizontally into alignment with the line of draft, the slot 25 comes out of alignment with the major axis of the ball base 26 and the arm 16 is thus held in position on the drawbar 11, against which it is supported by an annular shoulder 31 at the top of the base 26.

It will be appreciated, of course, that it is also possible to mount the ball unit 13 on the drawbar 11 so that the major axis of the ball base 26 is aligned with the line of draft, while the slot 25 in the arm base portion 16a is offset to one side of the line of draft, but even in such event the arm 16 must be held obliquely to the line of draft during its installation or removal, as already described.

As will be apparent from FIG. 1, the base portion 16a of the load equalizing arm 16 extends forwardly from the ball unit 13 along the drawbar 11, and then upwardly over the ball and socket connection 13, 14 and rearwardly to the suspension means 18, thus providing for an efficient transfer of load from the draft tongue 15 directly to the drawbar 11 at a point well forwardly of the ball and socket connection, so that sagging and lateral sway at the ball and socket connection are effectively minimized, if not completely eliminated.

The load equalizing arm 16 as a whole is rigid, in the sense that it is not flexible to an extent which would interfere with proper transfer of the load force, as already mentioned. However, the rigid arm possesses some degree of inherent resiliency, particularly in the tapered top portion 16c thereof, so that a certain amount of cushioning is obtained in transfer of the load from the draft tongue to the drawbar. This cushioning effect may be adjusted for different loads by raising or lowering the suspension means 18 in order to place the load equalizing arm 16 under a desired amount of pre-tension.

FIG. 5 shows a slightly modified arrangement of the ball unit 13a which is composed of an assembly of separate components held together by a screw 128 with a round head 128' which serves to complement the ball member 127, while the base 126 is positioned on the screw 128 as a separate entity from the ball member.

What is claimed as new is:

1. A load equalizing hitch assembly comprising in combination a drawbar adapted to be mounted at the rear of a towing vehicle so as to project rearwardly therefrom, a ball unit provided at the rear end of said drawbar, said ball unit including a base and a ball member surmounting said base, a draft tongue extending forwardly from a trailer, an inverted socket provided at the front end of said draft tongue and engaging said ball member of the ball unit, a load equalizing arm mounted on said drawbar by said base of the ball unit, said arm extending upwardly over said ball unit and socket and rearwardly over said draft tongue, and suspension means for said load equalizing arm provided on said draft tongue at a point spaced rearwardly from said socket.

2. The device as defined in claim 1 which is further characterized in that said load equalizing arm suspension means are vertically adjustable.

3. The device as defined in claim 1 wherein said load equalizing arm is rigid and includes a flat base portion in supporting engagement with and extending along said drawbar forwardly from said base of the ball unit, an intermediate portion projecting upwardly from said base portion, and a top portion extending rearwardly from said intermediate portion to said suspension means.

4. The device as defined in claim 3 together with means separably connecting said base portion of the load equalizing arm to the base of said ball unit.

5. The device as defined in claim 3 wherein said base portion of the load equalizing arm is provided with a circular aperture communicating with a rearwardly open slot of a smaller width than the diameter of said aperture, the base of said ball unit being horizontally elongated to provide a major axis substantially corresponding to the diameter of said aperture and a minor axis substantially corresponding to the width of said slot, whereby the ball unit base may be inserted through the slot into the aperture when the major axis of the base is aligned with the slot, but whereby the ball unit base may be locked in the aperture when the load equalizing arm is turned horizontally to place the slot out of alignment with the major axis of the ball unit base.

References Cited
UNITED STATES PATENTS

| | | | |
|---|---|---|---|
| 2,738,206 | 3/1956 | Loughner | 280—461 |
| 2,789,834 | 4/1957 | Chism | 280—406 |
| 2,793,878 | 5/1957 | Toland | 280—406 |
| 3,445,125 | 5/1969 | Stewart | 280—475 |

LEO FRIAGLIA, Primary Examiner

U.S. Cl. X.R.
280—475, 489